United States Patent
Pellegrini Mammana et al.

(10) Patent No.: US 6,954,078 B2
(45) Date of Patent: Oct. 11, 2005

(54) TRANSPARENT TABLET FOR EVALUATION OF MOTOR RESPONSES

(75) Inventors: Alaide Pellegrini Mammana, Campinas (BR); Victor Pellegrini Mammana, Campinas (BR)

(73) Assignee: Centro de Pesquisas Renato Archer-Cenpra (MCT), Campinas (BR)

(*) Notice: Subject to any disclaimer, the term of this patent is extended or adjusted under 35 U.S.C. 154(b) by 0 days.

(21) Appl. No.: 10/486,341
(22) PCT Filed: Aug. 12, 2002
(86) PCT No.: PCT/BR02/00113
§ 371 (c)(1), (2), (4) Date: Feb. 10, 2004
(87) PCT Pub. No.: WO03/014672
PCT Pub. Date: Feb. 20, 2003

(65) Prior Publication Data
US 2004/0194542 A1 Oct. 7, 2004

(30) Foreign Application Priority Data
Aug. 10, 2001 (BR) .............................................. 0104845

(51) Int. Cl.⁷ ............................................... G01R 31/02
(52) U.S. Cl. ...................... 324/754; 324/158.1; 345/179
(58) Field of Search ................................ 324/72.5, 754, 324/761, 770, 158.1; 178/18.05, 18.06, 19.06; 235/462.45, 472.01; 345/104, 173, 179

(56) References Cited

U.S. PATENT DOCUMENTS

| 4,678,869 A | * | 7/1987 | Kable ....................... 178/18.05 |
| 4,972,496 A | * | 11/1990 | Sklarew ....................... 382/187 |
| 4,988,837 A | * | 1/1991 | Murakami et al. ....... 178/18.07 |
| 5,895,906 A | * | 4/1999 | Danielson et al. ..... 235/462.45 |
| 2002/0152606 A1 | * | 10/2002 | Huang |

FOREIGN PATENT DOCUMENTS

| JP | 62-128321 | 6/1987 |
| JP | 62-226321 | 10/1987 |
| JP | 10-301716 | 11/1998 |
| JP | 11-134102 | 5/1999 |
| JP | 11-154053 | 6/1999 |
| JP | 2001-35261 | 2/2001 |
| JP | 01-193920 | 7/2001 |
| JP | 01-206425 | 7/2001 |

OTHER PUBLICATIONS

Chi–Fang Huang, Printed–On–Display Antenna Of Wireless Mobile Personal Terminal, Apr. 19, 2001, Pub. No. US 2002/0152606 A1.*

* cited by examiner

Primary Examiner—Minh N. Tang
(74) Attorney, Agent, or Firm—Burns, Doane, Swecker & Mathis

(57) ABSTRACT

Transparent tablet for evaluation of motor responses furnishes the coordinates of the contact points of at least one conductive probe tip on tablet. The tablet is overlaid on its outer face by a resistive transparent film, such as tin dioxide. By the provision of a current-generating device in first and in second directions, voltage gradients are set up along the resistive transparent film in the first and second directions. The voltages picked up by the conductive probe tip at the point of contact are proportional to the distance of the point to the edges of the tablet along each of the directions. The numerical values of the point coordinates are furnished by the conversion to digital form, by an A/D converter, of the voltage.

18 Claims, 5 Drawing Sheets

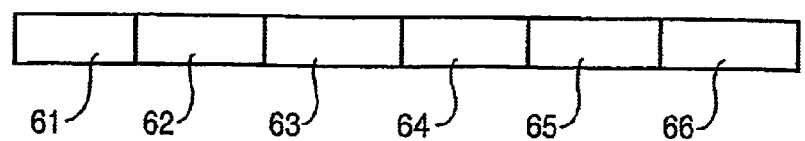
*Fig. 5-a*
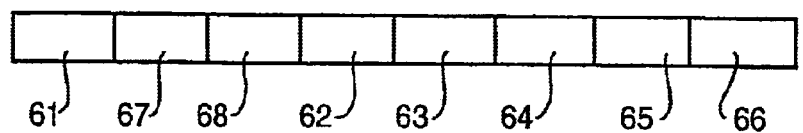
*Fig. 5-b*

TRANSPARENT TABLET FOR EVALUATION OF MOTOR RESPONSES

BACKGROUND OF THE INVENTION

The present invention refers to a device that furnishes the spatial and temporal coordinates of the points of the point in a transparent plate that is touched by the tip of a probe. Such a device is particularly useful in the evaluation of motor performance, alternative or augmented communication systems, map-making, support systems for special teaching techniques, etc.

The integration between several sources of sensory information and the production of motor responses is a physiological function required in many common situations, with applications in the research of motor behavior in normal and handicapped individuals.

One line of research of said function is based on the touch, with probe tips, of targets of different shapes, dimensions, distances and positions, said targets being either static or dynamic. Static targets comprise figures printed or drawn in sheets of paper or cardboard, while dynamic targets can be shown in video monitors or projection devices. The act of touching can be triggered by visual or auditory stimuli, so as to allow the detection of correlations between the subject's responses to standardized stimuli. Said investigations are carried out having in mind the clinical analysis and remedial action in dysfunction-bearing populations. However, said research has been hindered by the lack of available specific and sophisticated tools that—owing to their high cost—are seldom available in areas with poor socio-economic conditions.

In view of the preceding, the invention has the main objective of providing a low-cost device that can be employed either with static or dynamic targets, and suitable for connection to a personal computer.

SUMMARY OF THE INVENTION

The above object is achieved by the invention by means of a device comprising a transparent glass plate overlaid on its outer surface by a transparent resistive film provided with means that produce sheet electric currents in a first and in a second directions, said currents having attributes that allow the identification of said currents, as well as at least one conductive probe, the determination of the coordinates of the point of contact between the tip of said probe and said surface being achieved by the measurement of the voltages picked up by said tip in each of said directions, said voltage values being digitized by an analogic/digital converter.

According to the invention, said identifying attributes are provided by the multiplexation of said currents.

According to another feature of the invention, the identification of the currents in a first direction and in a second direction is provided by the time switching of said currents, this is to say, the currents are applied to the transparent resistive sheet alternately and sequentially in a first and in a second directions.

According to another feature of the invention, the first current is an AC current with a first frequency and the second current is an AC current with a second frequency, said first and second currents being simultaneously applied to said transparent sheet.

According to yet another feature of the invention, said glass plate has a rectangular shape and said directions are ortogonal to each other.

The above mentioned features of the invention shall be better understood by the following description of several illustrative embodiments that follow, taken in connection to the accompanying drawings.

BRIEF DESCRIPTION OF THE DRAWINGS

FIG. 5 shows the structure of the data packets forwarded to the computer, corresponding to one- and two-probe devices.

DETAILED DESCRIPTION OF THE INVENTION

Figure 1:
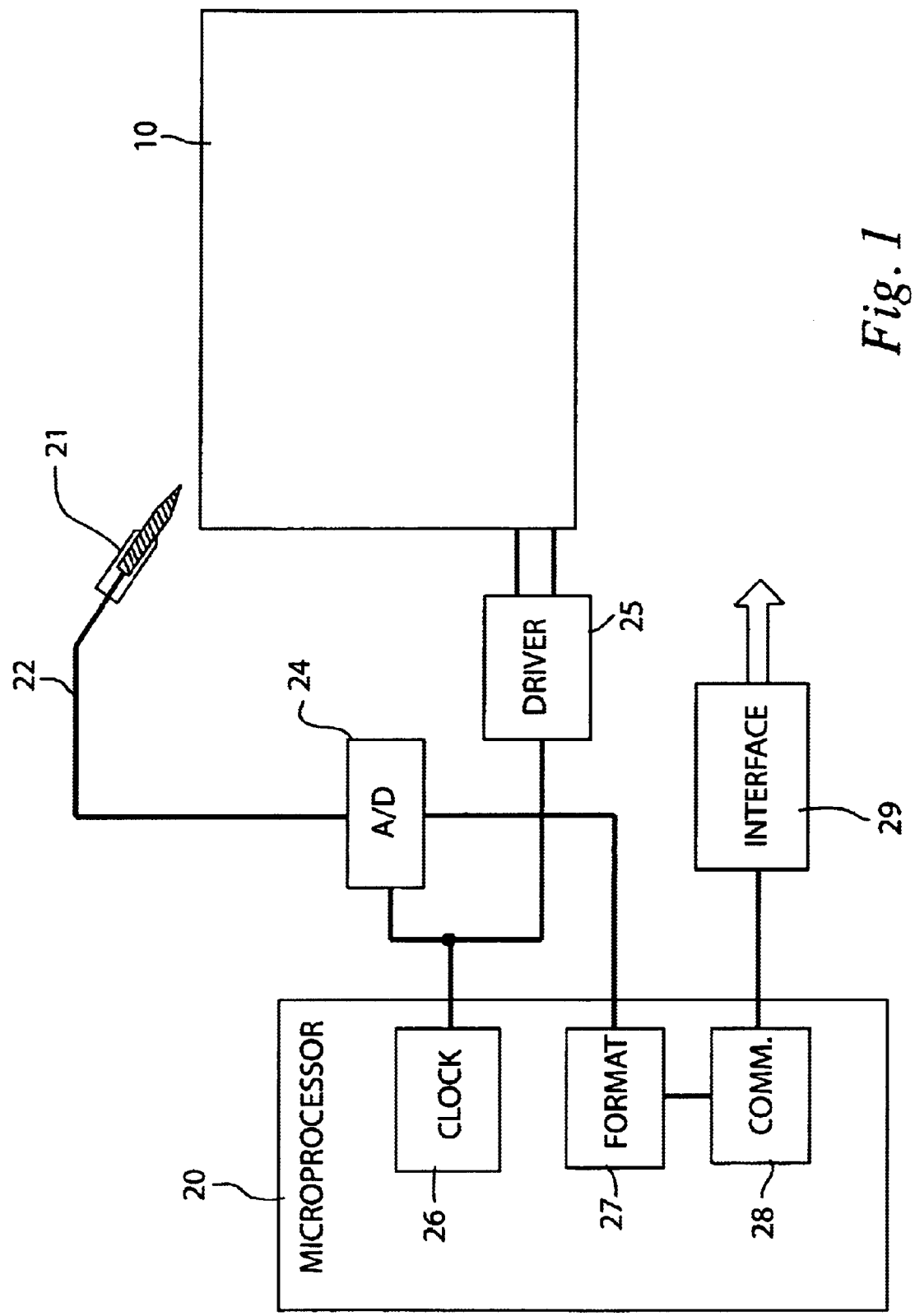
FIG. 1 shows, by means of a block diagram, the main component parts of the proposed invention.

Referring now to the drawing of FIG. 1, the object of the invention consists of a tablet comprising a glass plate 10 overlaid with a transparent resistive film such as tin dioxide, and at least one conducting probe 21 connected by a flexible cable 22 to the A/D converter 24, the output of which is connected to a microprocessor 20 which processes the information collected by the probe tip. Said processing performed by block 27 comprises formatting the information concerning the X and Y coordinates at the moment that said tip touched the tablet. Said processing additionally comprises the filtering of transients and noise, as well as repeated or null readings, which can be implemented by software stored in microprocessor 20.

The data is formatted according to the application, because the system allows the emulation of a standard mouse, among other features. In this case the rate of transmission is 1200 bauds, the mouse function being activated by means of double press (i.e., double click) and drag, for example. In another embodiment, the probe operates as a mouse, in which case it will be provided with a pushbutton which will be connected to the microprocessor input through a second wire.

When the application requires the X/Y position data in real-time, the transmitted packet comprises a start byte 61, two bytes 62, 63 containing the X value, one separating byte 64 and two bytes 65, 66 for the Y coordinate, such as depicted in FIG. 5-*a*. When two probes are used, an additional byte 67 is included, informing which probe the data refers to, followed by a separation byte 68, as shown in FIG. 5-*b*.

These packets are processed by the data communication block 28, which may be a USART or UART operating in the duplex mode, that communicates with the microcomputer by means of a serial interface 29 and 9-way cable, infrared or radio link, etc.

Figure 2:
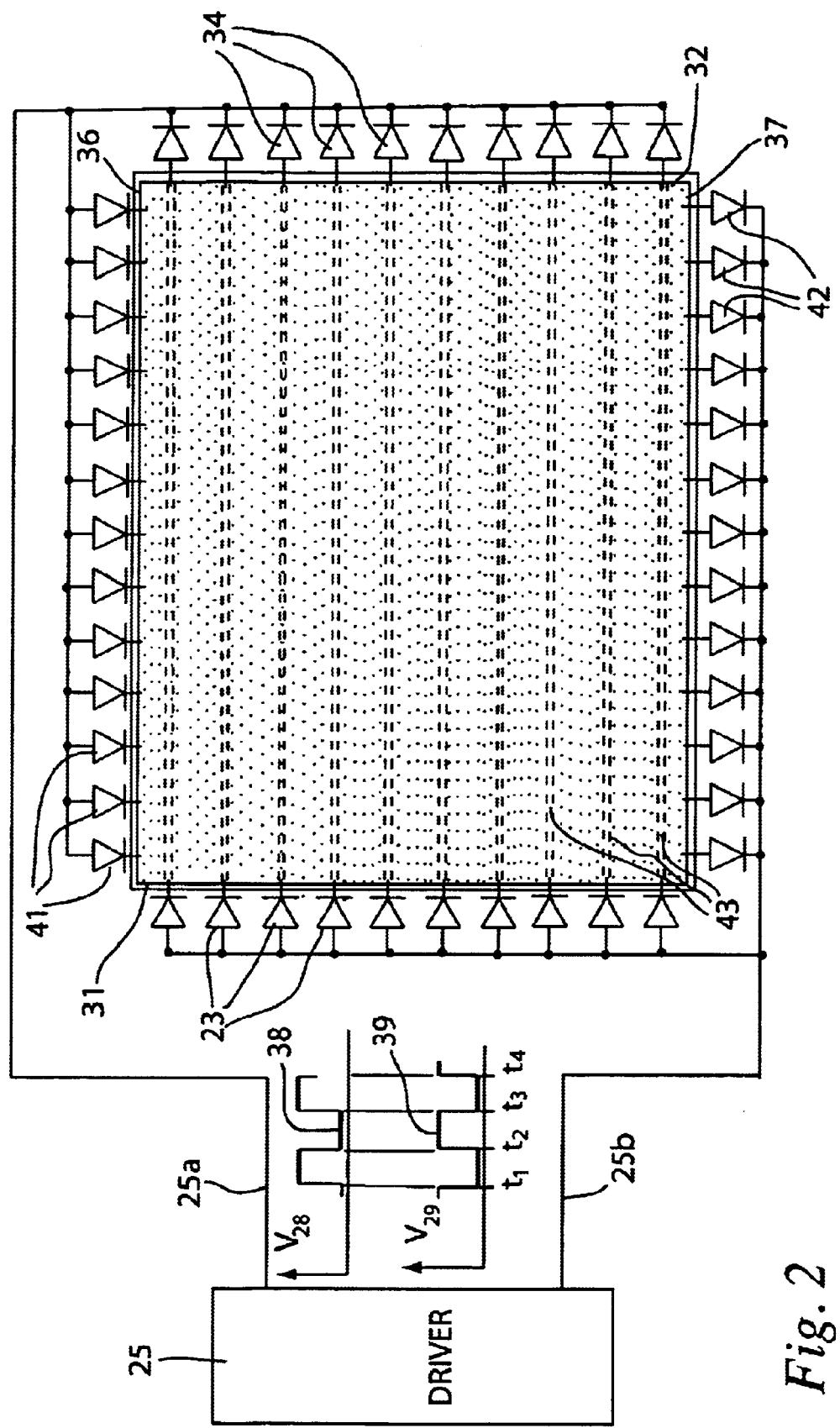
FIG. 2 shows the electrical connections relating to the transparent resistive film that overlays the glass plate.

According to FIG. 2, the tablet comprises a rectangular glass plate overlaid with a resistive conducting transparent film such as, for example, tin dioxide, having a surface resistance in the order of 300 . . . 1000 ohms per square, in the embodiment described herein. According to the invention, a DC voltage is applied between vertical edges 31, 32 of the resistive film and, in the following half-cycle, the same voltage is applied between horizontal edges 36, 37. This operation is carried out by driver block 25, that generates two symmetrical square waves 38 and 39 with opposing phases, the former being forwarded by line 25a to a first and second set of parallel-connected diodes, said first set comprising diodes 41 having their cathodes connected to upper edge 36 of said rectangular resistive film and said second set comprising diodes 34 having their anodes connected to the right-hand edge 32 of said rectangular resistive film. Opposed-polarity square wave 39 is forwarded to a third and fourth diode sets through line 25b, said third diode set comprising diodes 42 having their anodes connected to lower edge 37 of said rectangular resistive film and the fourth diode set comprising diodes 23 having their cathodes connected to the left-hand edge of said rectangular resistive film. All diodes are uniformly distributed along the edges to which they are connected, the distance between them determining the precision of the measured touch-point coordinates.

According to the invention, when a voltage difference is applied between opposing edges, a laminar current is set up between said edges, the magnitude of which depends on the value of said voltage as well as on the film resistance. Considering, for instance, the half-period t2–t3 when wave 38 is negative and wave 39 is positive, diode sets 23 and 34 are directly polarized and conducting, while diode sets 41 and 42 are inversely polarized and cut-off. In this case, left-hand edge 31 of the tablet has a positive potential relative to right-hand edge 32, and current lines 43 are set between said edges. Therefore, the voltage measured at any point along the X direction will be in proportion to the distance of said point to said edges: right on the left-hand edge 31 the voltage value will be equal the square-wave voltage 39 less the conduction voltage drop through the diodes. On the right-hand edge 32 the voltage will be equal to the lower square-wave voltage 38 plus the conduction voltage drop through the diodes, while in-between it will have an intermediate magnitude. Each time the probe tip touches the tablet surface, the voltage at the contact point is read by the A/D converter 24.

In the following half-cycle $t_3$-$t_4$, the polarities of said square-waves are inverted, and diode sets 41 and 42 will conduct, the resulting current flux being directed from upper edge 26 to the lower edge, the voltage measured at each point of the tablet surface being proportional to the distance of said point to said edges.

Figure 3:
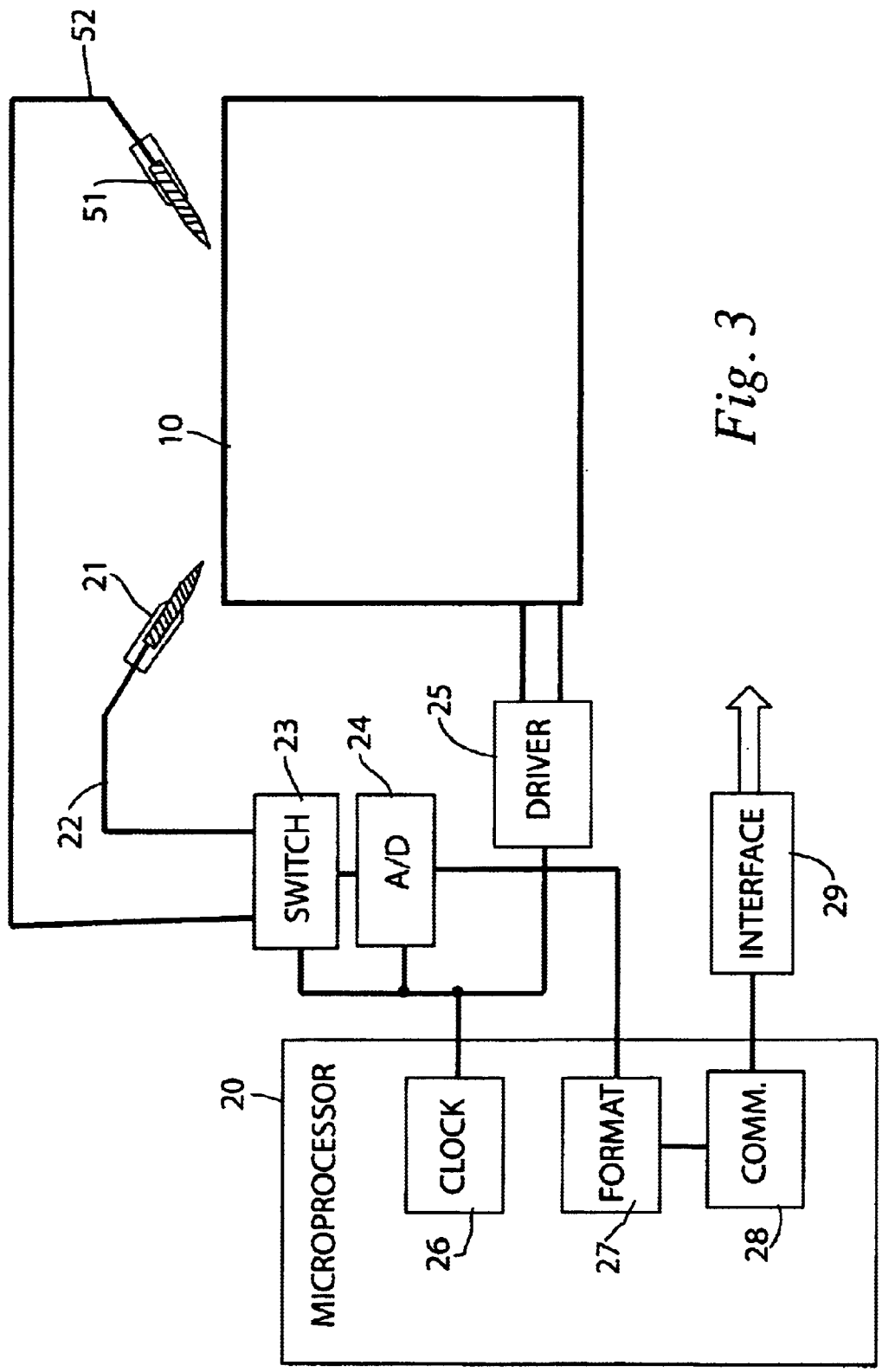
FIG. 3 shows the block diagram of a system provided with two probes, according to the invention.

According to FIGS. 1 and 2, microcontroller 20 is provided with an internal clock 26 which synchronizes operation of driver 25 as well as of A/D converter 24. The square-wave frequency is matched to the operating speed of said A/D converter, typically in the order of 1 kHz. When two probes are used as shown in FIG. 3, said clock also synchronizes the switching between readings of probes 21 and 51 by means of the auxiliary switch 23 which has two inputs connected to cables 22 and 52. Thus, the X and Y coordinate readings of probe 21 are followed by the X and Y coordinate readings of probe 51.

The probe tips can be metal or a non-metallic conducting material. Soft or flexible conducting materials, such as graphite, are desirable due to reduction of friction against the conducting film surface and diminishing wear of the latter. The tip size determines the resolution in X and Y coordinate measurement, which is usually in the order of 1 millimetre.

Figure 4:
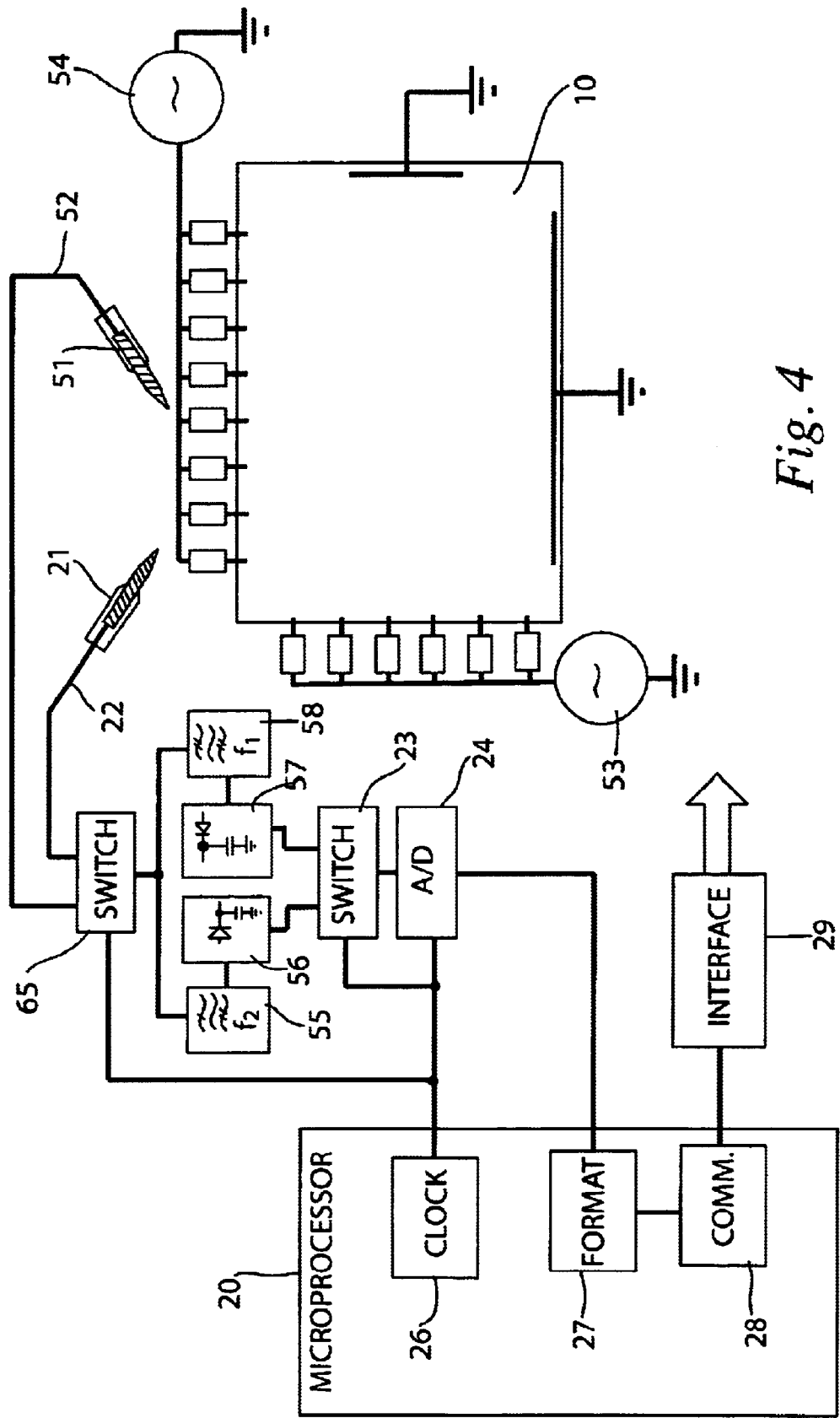
FIG. 4 shows a second embodiment of the invention.

A second embodiment of the invention is shown in FIG. 4. Instead of switching a DC voltage, two AC signals are simultaneously applied between opposing edges of the tablet. A first signal with frequency $f_1$, supplied by generator 53, is applied between the side edges while a second signal having frequency $f_2$, supplied by generator 54, is applied between the upper and lower edges. Therefore, two sets of current lines will coexist in said resistive film: a first set in the X direction with frequency $f_1$, and a second set of current lines in the Y direction with frequency $f_2$.

When probe tip 21 touched the resistive film surface, cable 22 will transmit a signal with two frequencies; the same will happen with probe tip 51 and cable 52. Said cables are connected to the two inputs of a switching device 65, which is controlled by the microprocessor clock 26, said switching device transmitting the signals picked up by probe tip 21 interspersed with the signals picked up by probe tip 51 to its output port. Said signals are fed to pass-band filters 55 and 58, respectively tuned to frequencies fl (correspondent to the X axis) and $f_2$ (correspondent to the Y axis), the rectification and filtering of said signals by blocks 56 and 57 furnishing DC voltages which are proportional to the position of each probe tip along the X and Y axes. A second switching device 23 forwards, in alternation, said voltages to the A/D converter 24, the remaining processing of the information following the steps already described.

Although the preceding description was based in two illustrative embodiments, it will be understood that modifications can be introduced while remaining within the bounds of the invention. For instance, a different material can be substituted for the tin dioxide in the transparent film that overlays the glass plate, as long as this material exhibits the necessary features of transparency and uniformity.

Considering that the tablet of the invention is transparent, it can be employed in a large variety of applications, ranging from digitizing table, spatial keyboard, signature digitalization, mouse, and so on.

Therefore, the invention is defined by the following claims.

What is claimed is:

1. TRANSPARENT TABLET FOR EVALUATION OF MOTOR RESPONSES furnishing coordinates of contact points of at least one conductive probe tip on a plate, wherein said plate is transparent and overlaid on an outer face by a continuous resistive transparent film, and means for setting up electric currents in first and second directions along said film, distinction between said currents being provided by identifying features specific to each of said currents.

2. TRANSPARENT TABLET FOR EVALUATION OF MOTOR RESPONSES as claimed in claim 1, wherein said identifying features consist of the timing of said currents provided by the alternate switching-on of the currents in said first and second directions.

3. TRANSPARENT TABLET FOR EVALUATION OF MOTOR RESPONSES as claimed in claim 2, wherein the coordinates of said contact points are determinated by a measurement of magnitudes of voltages picked up by said probe tip when touching said resistive transparent film, in each of the two said directions.

4. TRANSPARENT TABLET FOR EVALUATION OF MOTOR RESPONSES as claimed in claim 2, wherein the values of the DC voltages are digitized by an A/D converter.

5. TRANSPARENT TABLET FOR EVALUATION OF MOTOR RESPONSES as claimed in claim 2, wherein said currents in the first and second directions are provided by applying a DC voltage between the left-hand and the right-hand vertical edges of said tablet in a first half-cycle, and of a DC voltage between the upper and lower edges of the tablet in a second half-cycle, operation of an A/D converter being synchronized with said first and second half-cycles.

6. TRANSPARENT TABLET FOR EVALUATION OF MOTOR RESPONSES as claimed in claim 2, wherein the transparent resistive film consists of tin dioxide.

7. TRANSPARENT TABLET FOR EVALUATION OF MOTOR RESPONSES as claimed in claim 3, wherein the transparent resistive film consists of tin dioxide.

8. TRANSPARENT TABLET FOR EVALUATION OF MOTOR RESPONSES as claimed in claim 1, wherein said identifying features consist of two different frequencies, each frequency being associated with the current in one of said two directions, and alternating voltages picked up by the probe tip are forwarded to bandpass filters tuned to a first and a second said frequencies, followed by rectification and filtering of resulting DC voltages.

9. TRANSPARENT TABLET FOR EVALUATION OF MOTOR RESPONSES as claimed in claim 8, wherein the values of the DC voltages are digitized by an A/D converter.

10. TRANSPARENT TABLET FOR EVALUATION OF MOTOR RESPONSES as claimed in claim 8, wherein the transparent resistive film consists of tin dioxide.

11. TRANSPARENT TABLET FOR EVALUATION OF MOTOR RESPONSES as claimed in claim 9, wherein the transparent resistive film consists of tin dioxide.

12. TRANSPARENT TABLET FOR EVALUATION OF MOTOR RESPONSES as claimed in claim 1, wherein said plate has a rectangular shape, current lines being parallel to X and Y axes, respectively.

13. TRANSPARENT TABLET FOR EVALUATION OF MOTOR RESPONSES as claimed in claim 12, wherein the transparent resistive film consists of tin dioxide.

14. TRANSPARENT TABLET FOR EVALUATION OF MOTOR RESPONSES furnishing coordinates of contact points of at least one conductive probe tip on a plate, wherein said plate is transparent and overlaid on its outer face by a resistive transparent film, and means for setting up electric currents in first and second directions along said film, distinction between said currents being provided by identifying features specific to each of said currents, wherein said plate has a rectangular shape, current lines being parallel to X and Y axes, respectively, wherein said currents in the first and second directions are provided by applying a DC voltage between the left-hand and the right-hand vertical edges of said tablet in a first half-cycle, and of a DC voltage between the upper and lower edges of the tablet in a second half-cycle, the operation of an A/D converter being synchronized with said first and second half-cycles.

15. TRANSPARENT TABLET FOR EVALUATION OF MOTOR RESPONSES as claimed in claim 14, wherein the transparent resistive film consists of tin dioxide.

16. TRANSPARENT TABLET FOR EVALUATION OF MOTOR RESPONSES furnishing coordinates of contact points of at least one conductive probe tip on a plate, wherein said plate is transparent and overlaid on its outer face by a resistive transparent film, and means for setting up electric currents in first and second directions along said film, distinction between said currents being provided by identifying features specific to each of said currents, wherein two probes are provided, voltages picked up by said two probes being alternately monitored.

17. TRANSPARENT TABLET FOR EVALUATION OF MOTOR RESPONSES as claimed in claim 16, wherein the transparent resistive film consists of tin dioxide.

18. TRANSPARENT TABLET FOR EVALUATION OF MOTOR RESPONSES furnishing coordinates of contact points of at least one conductive probe tip on a plate, wherein said plate is transparent and overlaid on its outer face by a resistive transparent film, and means for setting up electric currents in first and second directions along said film, distinction between said currents being provided by identifying features specific to each of said currents, wherein said identifying features consist of the timing of said currents provided by the alternate switching-on of the currents in said first and second directions, wherein said currents in the first and second directions are provided by applying a DC voltage between left-hand and right-hand vertical edges of said tablet in a first half-cycle, and applying a DC voltage between upper and lower edges of the tablet in a second half-cycle, operation of an A/D converter being synchronized with said first and second half-cycles.

* * * * *